Aug. 11, 1953    L. B. NEIGHBOUR ET AL    2,648,415
CLUTCH AND BRAKE MECHANISM AND COORDINATED CONTROL THEREFOR
Filed March 8, 1950     2 Sheets-Sheet 1
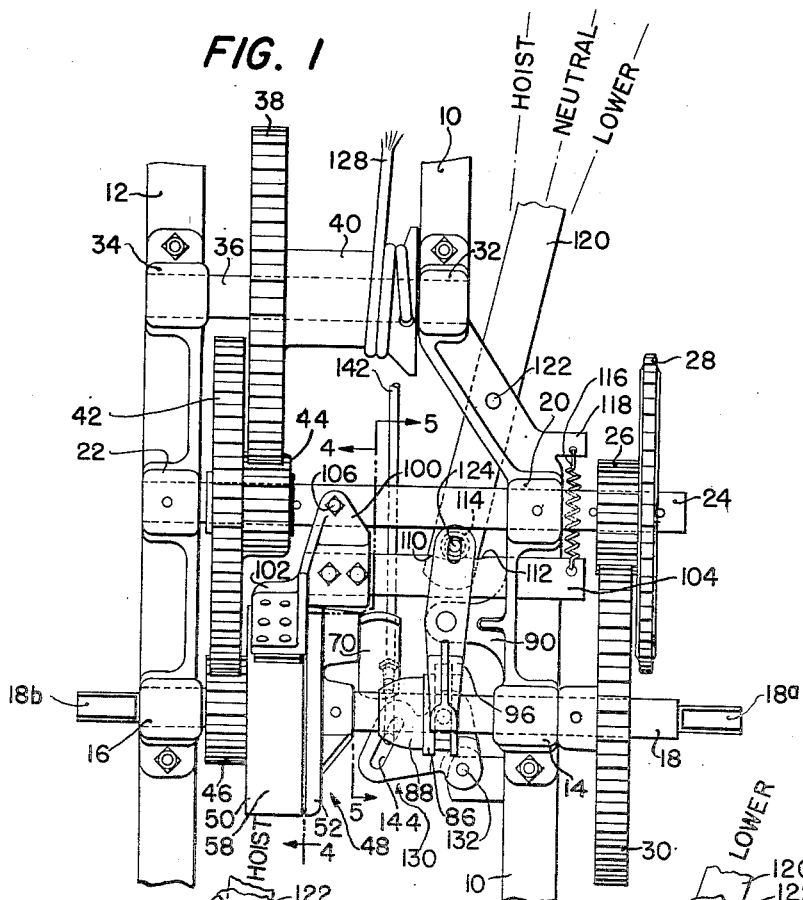
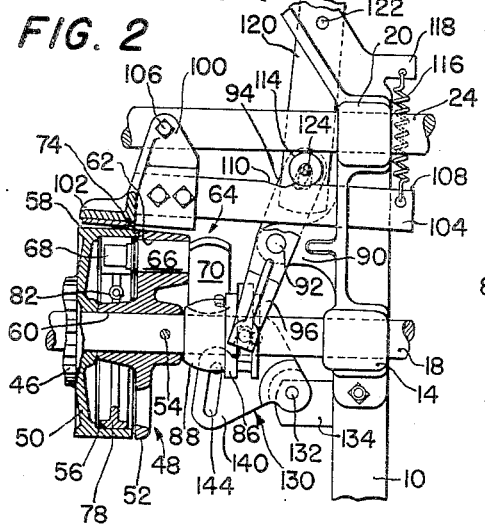
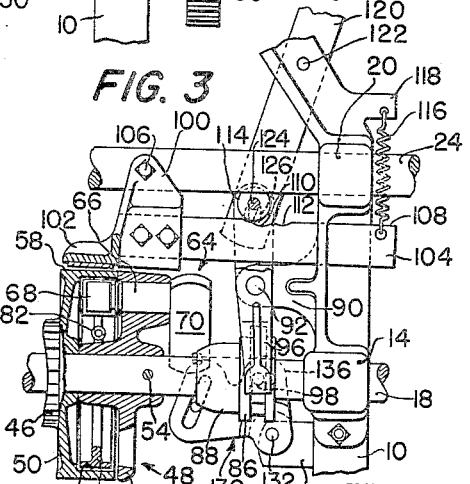
INVENTORS
L. B. NEIGHBOUR &
O. P. LANCE
ATTORNEYS Aug. 11, 1953     L. B. NEIGHBOUR ET AL     2,648,415
CLUTCH AND BRAKE MECHANISM AND COORDINATED CONTROL THEREFOR
Filed March 8, 1950
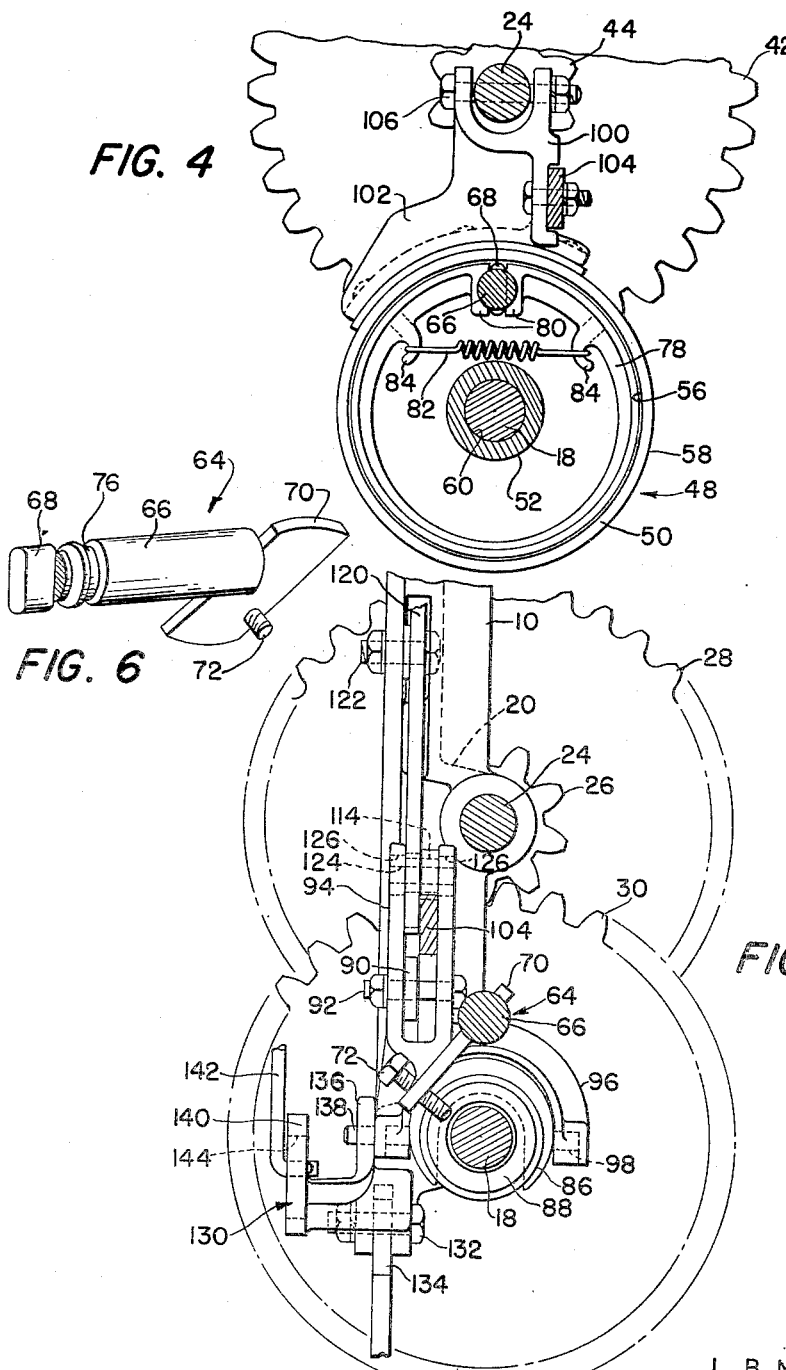

Patented Aug. 11, 1953

2,648,415

UNITED STATES PATENT OFFICE 2,648,415

CLUTCH AND BRAKE MECHANISM AND COORDINATED CONTROL THEREFOR

Leonard B. Neighbour and Orville P. Lance, Moline, Ill., assignors to Deere & Company, Moline, Ill., a corporation of Illinois Application March 8, 1950, Serial No. 148,487

3 Claims. (Cl. 192—17)

This invention relates to driving mechanism and more particularly to driving mechanism having brake and clutch means and coordinated control therefor.

The present invention finds its greatest utility in driving mechanisms of the hoist or winch type in which a constantly applicable source of power is selectively connectible to or disconnectible from a power train to drive or stop a hoist or winch used in raising and lowering loads. A particular example of this utility is the conventional so-called wagon dump used on farms, for example, for the dumping of wagon loads of grain onto the ground or into elevator hoppers for subsequent transfer to storage bins.

In a typical instance of the character referred to, grain is hauled in a wagon or truck and the vehicle is driven onto the platform of a wagon dump to which a hoist or winch is connected. Power is supplied to the hoist or winch from the power take-off of a tractor, from a stationary power plant, or from any other suitable source. The hoist or winch mechanism is provided with clutch means selectively operative to connect this power to a cable-winding drum, for example, so that the platform on which the vehicle is carried may be elevated, thus elevating one end of the vehicle and permitting the grain to be dumped. It is desirable in a power train of this character to have control means readily available to the operator so that the clutch may be disconnected at any appropriate time. It is further desirable to incorporate in the power train brake means for preventing inadvertent or accidental lowering of the platform before the dumping operation is completed. Of primary importance is the safety requirement, since heavy loads and equipment are handled and there is always the likelihood of danger to equipment and personnel. For this reason, it is extremely important to provide a power train having coordinated control of the brake and clutch mechanism. Normally, the desideratum is control means operative to effect selectively engagement of the clutch and release of the brake or disengagement of the clutch and engagement of the brake, with further provision for releasing the brake while the clutch is disconnected so that the elevated platform may be lowered without requiring the power to be cut off.

The principal object of the present invention resides in the provision of an improved control having the characteristics set forth immediately above. Further, it is a feature of the present invention to relate the clutch and brake control means by a single control lever which facilitates and simplifies the operation and control of the power train. Specifically, this object is accomplished by the provision of a power train in which the clutch is normally disengaged and the brake is normally engaged. A single control lever is mounted for movement from a central or neutral position in which the aforesaid conditions obtain to either of two active positions. In one active position, the clutch is engaged and the brake is released. In the other active position, both the clutch and brake are released. In this respect, it is a further feature of the invention to establish the neutral position as a safety position to which the control lever may always be returned so that no power is transmitted and further so that the brake will hold the mechanism in a set position and against reversal.

The foregoing and other important objects and desirable features inherent in and encompassed by the invention will become apparent to those versed in the art as a preferred embodiment of the invention is fully disclosed in the following detailed description and accompanying sheets of drawings in which:

Figure 1 is a side elevational view of the power train or driving mechanism including the coordinated control means, the control lever being shown in a central or neutral position;

Figure 2 is a view of a portion of the structure of Figure 1, partly in section, and showing the control lever in one of its active positions;

Figure 3 is a view similar to that appearing in Figure 2 but showing the control lever in its other active position;

Figure 4 is a transverse fragmentary sectional view taken substantially along the line 4—4 of Figure 1;

Figure 5 is a transverse fragmentary sectional view taken substantially along the line 5—5 of Figure 1;

Figure 6 is a perspective view showing the detail of the clutch-operating element.

Although the foregoing description of fundamental aspects is based upon a specific embodiment and utility of a power train of the type herein characterized, it should be understood that such description is merely for the purposes of orientation and explanation and that the principles of the invention have wider application.

The driving mechanism shown in Figure 1 includes or is carried by means providing a support and comprising a pair of frame members 10 and 12. These members are provided respectively with bearings 14 and 16 for journaling an input or driving shaft 18. Opposite ends of this shaft are squared or otherwise provided of suitable sections, as at 18a and 18b, for the connection thereto of a driving shaft from the power take-off of a tractor or other suitable source of power. In the present instance, the shaft portions 18a and 18b provide for the transmission of power to or from either end of the shaft 18.

The frame members 10 and 12 respectively carry a pair of shaft carriers 20 and 22 coaxial on an axis parallel to the shaft 18 and spaced thereabove. These carriers serve to mount nonrotatably on the frame or support 10—12 an idler shaft 24. This shaft projects to the right beyond the frame or support member 10 and has journaled thereon a driving element comprising a pinion 26 and sprocket 28. The pinion is in constant mesh with a larger gear 30 keyed to the input shaft 18. The sprocket 28 thus provides a third means for transmitting power to or from the shaft 18; that is, the sprocket 28 is in addition to the shaft portions 18a and 18b and may be suitably connected, for example, to an adjacent internal combustion engine (not shown).

The frame or support members 10 and 12 further carry an additional pair of bearings 32 and 34 in which is journaled an output or driven shaft 36 that is parallel to the shafts 18 and 24. This shaft has keyed thereto a relatively large gear 38 and a cable-winding drum 40. It will be obvious, of course, that the gear 38 and drum 40 could be integrally connected for rotation together and journaled on the shaft 36 which in turn could be fixedly carried at 32 and 34. The possibility of the alternative is of minor importance.

The shaft 24 has journaled thereon just inside the frame member 12 a relatively large gear 42 with which is integrally formed a pinion 44 that is in constant mesh with the gear 38. Since the gear 42 and pinion 44 are journaled on the shaft 24, as are the pinion 26 and sprocket 28, there is no direct drive between the input member 26—28 and the output member 42—44 other than as established through the power train connection to be subsequently described.

The shaft 18 carries just inwardly of the frame member 12 a pinion 46 that is in constant mesh with the gear 42. This pinion 46 is journaled or loose on the shaft 18 and depends for the transmission of power thereto from the shaft 18 upon clutch mechanism, designated generally by the numeral 48.

The clutch comprises a driven number 50 preferably formed integral with the pinion 46 and thus journaled or loose on the shaft 18; and a driving member 52 keyed or pinned at 54 to the shaft 18, or otherwise fixed to the shaft 18, for rotation therewith. The clutch driven member 50 is shown in the form of a drum having an interior annular clutch face 56 concentric with the shaft 18. This driven member further has an exterior annular brake face 58. The clutch driving member 52 is in the form of a circular plate bored centrally at 60 to receive the shaft 18 and bored at 62 to provide a cylindrical interior bearing surface on an axis parallel to and radially spaced from the axis of the shaft 18. This bearing surface carries a rockable clutch control element designated generally by the numeral 64 and shown by itself in perspective in Figure 6.

As best shown in Figure 6, the element 64 comprises a rockshaft portion 66 having at one end thereof an actuating cam 68 and at its other end an operating member 70 which will be hereinafter referred to as a flag. The flag 70 is rigid with the rockshaft 66, being preferably welded to the end thereof. This flag carries an adjustable means therein in the form of a cap screw 72, the purpose of which will presently appear. The element 64 is carried by the clutch driving member 52 as best shown in Figures 2, 3 and 4. The rockshaft portion 66 is journaled in the interior bearing surface 62, the cam 68 being located within the periphery of the clutch face 56 and the flag 70 being located outside or to the right of the clutch. The element 64 is held in place in the clutch driving member 52 by means of a snap ring 74 received in an annular groove 76 at the end of the rockshaft 66 proximate to the cam 68.

The clutch further includes means for effecting engagement and disengagement between the driven and driving members 50 and 52. This means preferably takes the form of a substantially completely circular shoe 78, the outer annular surface of which provides a cooperative clutch face connectible with or disconnectible from the inner clutch face 56 of the clutch driven member 50. As best seen in Figure 4, opposite terminal ends of the shoe 78 are provided respectively with flat cam portions 80 between which the cam 68 of the clutch-actuating element 64 is received. Rocking of the element 64 about the axis of the rockshaft 66 will effect expansion or contraction of the shoe 78, assisted by a tension spring 82 cross connected between anchor points 84 within the shoe.

A clutch-operating member in the form of a throw-out collar 86 is carried by the shaft for axial shifting therealong selectively in opposite directions. The collar 86 has an annular cam portion 88 engageable with the adjusting screw 72 of the flag 70 for effecting swinging of the flag and consequently rocking of the rockshaft 66 which ultimately effects expansion or contraction of the clutch shoe 78. In Figure 1, the clutch collar 86 is in a neutral position and the clutch is disengaged or disconnected, the normal function of the tension spring 82 being to contract the clutch shoe 78. In Figure 2, the collar 86 has been shifted to the left so that the cam portion 88 swings the flag 70 outwardly so that the cam 68 is turned to expand the clutch shoe 78 into engagement with the interior clutch surface 56 of the clutch driven member 50. It will be understood that the element 64 is carried at all times for rotation with the clutch driving member 52 and shaft 18. However, since the speeds of rotation are relatively low, any centrifugal force acting against the flag 70 is not sufficient to overcome the tension of the spring 82.

The frame member 10 has an ear 90 rigid thereon and projecting inwardly toward the clutch 48. This ear has means providing a transverse pivot 92 on which a lever 94 is pivoted intermediate its ends. The axis of the pivot 92 is tranverse or normal to the axis of the shaft 18 and the lower end of the lever 94 projects toward the shaft 18 in the form of a fork 96 which embraces the upper portion of the clutch collar 86 and which has a pair of trunnions 98 loosely received in the annular groove in the clutch collar. It will be seen that rocking of the lever 94 from its central or neutral position in Figure 1 to either of the active positions of Figure 2 or Figure 3 will effect axial shifting of the collar 86 so as to control the clutch 58. When the lever is rocked so as to move the collar 86 to the left to effect connection or engagement of the clutch parts, movement of the collar 86 is limited by engagement thereof with the hub of the clutch driving part 52. It will be noted that shifting of the collar 86 by means of rocking the lever 94 to the position of Figure 3 is beyond the neutral position in which the clutch 48 is disconnected. Because of the cooperation between the clutch control collar 86 and the flag 70, such overshifting of the collar does not affect the clutch after the clutch is disengaged. However, this overshifting is utilized to control brake means, the details of which will be set forth below.

As stated above, the shaft 24 is idle and is fixed in the frame members 10 and 12 by means of the carriers 20 and 22. Thus the shaft 24 serves as a support for the pivotal mounting of a bracket 100 which forms part of a brake-operating member comprising a brake shoe 102 and an operating arm or extension 104. The pivotal mounting of the bracket 100 on the shaft 24 includes a pivot pin 106 having its axis parallel to the pivot axis of the pivot pin 92 for the clutch lever 94. The arm 104 extends toward the same side of the clutch 48 as the range of movement of the collar 86. The arm is generally parallel to the shaft 18 and is proximate to the upper end of the clutch lever 94. This arm includes an upper edge portion 108 provided with cam means having a pair of notches 110 and 112, the sides of which provide high cam portions selectively cooperative with a roller 114 carried by the upper end of the lever 94. In the neutral position of the mechanism (Figure 1), the brake-operating member 102—104 is held in a brake-engaged position by a yielding or biasing means in the form of a tension spring 116 connected between the free end of the arm 104 and an ear 118 formed on the frame member 10; the brake shoe 102 is thus engaged with the brake surface 58 of the clutch driven member 50, the brake surface and the brake shoe 102 respectively comprising first and second selectively engageable and releasable brake parts associated with the clutch 48 and under control of the clutch-actuating means.

The upper end of the clutch lever 94 is bifurcated (Figure 5) and receives therebetween the lower end of a manually operative control lever 120. This lever is pivoted at 122 on a portion of the frame member 10 above the shaft 24. The connection between the lever 120 and the clutch lever 94 includes a transverse pin 124 which serves also to mount the roller 114. The connection between the two levers also includes vertical slots 126 to accommodate relative movement between the levers.

In addition to control of the clutch and brake by means of the control lever 120, there is provided automatic throw-out means operative in response to predetermined travel of whatever means is connected to the cable-winding drum 40. The general concept of automatic throw-out means is well known and familiarity therewith will be assumed. For the present purposes it may be taken that the automatic throw-out means is controlled by a cable 128 wound on the drum 40. The automatic throw-out means includes a bell crank 130 pivoted at 132 on an ear 134 rigid on the frame member 10. One arm 136 of the bell crank 130 has a trunnion connection 138 with the clutch-actuating collar 86. The other arm 140 of the bell crank 130 is connected to a rod 142 that extends upwardly adjacent the cable-winding drum 40. The connection of the rod 142 to the bell crank 130 includes a slot 144 to provide for lost motion necessary during operation of the parts.

*Operation*

As shown in Figure 1, the main control lever 120 is in its neutral position. The clutch 48 is disengaged, the throw-out collar 86 being in a central or neutral position. The brake 58—102 is engaged, the spring 116 operating through the arm 104 to hold the shoe 102 tightly against the brake surface 58 on the clutch driven member 50. Power supplied to the shaft 18 through either end portion 18a or 18b or through the sprocket 28, pinion 26 and gear 30, rotates the clutch driving part 52 and actuating element 64. The remaining components of the power train are stationary, this relationship being established by the engaged brake 58—102, the holding power of which is multiplied and transmitted to the cable-winding drum 40 by means of the pinion 46, gear 42, pinion 44 and gear 38.

When the parts are in their neutral positions, the roller 114 at the connection between the levers 120 and 94 is engaged in the low cam portion established by the left-hand notch 110 in the brake-operating arm 104, thus, with the assistance of the spring 116, establishing a detent for releasably maintaining the neutral position.

When it is desired to operate the power train so that the cable 128 is wound on the drum 40, the control lever is rocked in a counterclockwise direction as viewed in Figure 1 and is thereby moved to its "hoist" or first active position, resulting in swinging of the lower end of the lever 120 and the upper end of the lever 94 to the right, whereupon the parts will assume the positions of Figure 2. As the lever 120 is rocked as aforesaid, the roller 114 rides out of the deeper notch 110 and into the shallower notch 112, at the same time depressing the arm 104 about its pivot 106 and disengaging the brake shoe 102 from the brake surface 58. Simultaneously, the lower end of the arm 94 swings to the left, carrying with it the clutch collar 86. The cam portion 88 on the collar 86 engages the cap screw 72 in the flag 70 and effects rocking of the rockshaft 66 so that the cam 68 of the actuating element 64 spreads the terminal ends of the clutch shoe 76, thus effecting connection of the driving and driven clutch parts. Power from the shaft 18 is thus transmitted through the driven clutch part 50 to the pinion 46 and thence through the gearing 42—44—38 to the drum 40.

When the power train has been operated to the desired extent, the operator may cease operation by merely moving the control lever 120 back to the neutral position, thus simultaneously effecting disconnection of the clutch 48 and reengagement of the brake parts 102 and 58. In the event that the power train has been driven long enough to create a predetermined condition to which the automatic throw-out means is responsive, a pull will be exerted on the throw-out rod 142, which will operate through the bell crank 130 to shift the clutch-control collar 86 from the position of Figure 2 to the position of Figure 1, simultaneously effecting return of the control lever 120 to its "neutral" position.

It is a characteristic of mechanism of the type herein disclosed that reversal thereof is accomplished by operation of the power train in a reverse direction by virtue of the load thereon. Either a clutch such as that shown at 48 must be disconnected or the initial source of power must likewise be rotated in a reverse direction. Obviously, the latter is undesirable.

Assuming that the driving mechanism in the present instance is used in a hoist and that an elevated position has been achieved by operation of the power train, lowering of whatever mechanism is driven by the power train may be accomplished by movement of the control lever 120 from its neutral to its "lower" or second active position. That is, the control lever 120 is moved from the position of Figure 1 to that of Figure 3. Although the clutch is disconnected when the parts are in the positions of Figure 1, movement of the control lever 120 to the position of Figure 3 will actuate certain parts of the clutch-controlling means. Yet, this actuation will not cause reengagement of the clutch but will permit the clutch parts to remain disengaged or disconnected. At the same time, the overshifting of the collar 86 to the right and consequent overshifting or angular movement of the clutch lever 94 in a counterclockwise direction is utilized to again release the brake 58—102. It will be noted that the upper edge 108 of the brake arm 104 lies generally on a chord of an arc drawn about the pivot 92. The arc so drawn defines the path through which the roller 114 moves as the lever 94 is rocked back and forth. In the neutral position of the lever 94 the roller is at a high point of the arc, or at a point spaced the maximum distance from the chord along which the upper edge 108 lies. Hence, as the lever 94 is rocked in either direction, the roller 114 is brought closer to the edge 108. Therefore, the brake is released when the control lever 120 is in either of its active positions, since the brake arm 104 is depressed at both sides of the neutral positions. The relationship of the upper edge 108 as a chord of an arc may be similarly established with respect to the pivot point 122 for the lever 120.

The descent of the load to which the cable is connected may be regulated by the operator by appropriate use of the control lever 120 to control the brake means 58—102 without causing engagement of the clutch 48. As will be seen, all that is necessary is movement of the control lever 120 from its "lower" position back to its neutral position. Any partial movement of the control lever 120 in the range indicated will result in application of the brake shoe 102 to the brake surface 58 in varying degrees as desired.

It will be seen from the foregoing description that a simplified and improved control means has been provided for a power train utilizing coordinated clutch and brake means. Various features of the invention not specifically enumerated above will undoubtedly occur to those versed in the art, as likewise will numerous modifications and alterations in the preferred embodiment of the invention disclosed, all of which may be achieved without departing from the spirit and scope of the invention as defined in the appended claims.

What is claimed is:

1. Driving mechanism, comprising: support means; selectively connectible and disconnectible clutch means journaled on the support means and including driving and driven parts; selectively engageable and disengageable brake means carried on the support means and including a first brake part rotatable with the clutch means driven part and a non-rotatable second brake part pivoted on the support means selectively movable into and out of engagement with the first brake part; a first lever connected to the clutch means, and means mounting said lever on the support means for rocking in one direction from a neutral position effecting disconnection of the clutch means, to a first active position effecting connection of the clutch means, and, selectively, in the opposite direction from said neutral position to also effect disconnection of the clutch means; a second lever pivoted on the support means and connected to the second brake part to move the second brake part selectively into and out of engagement with the first brake part, said second lever extending from its pivot in intersecting relation to the first lever; means biasing the second lever in one direction to effect engagement of the brake parts; and cooperative interengageable means respectively on the first and second levers and including a low cam portion between a pair of spaced apart high cam portions on the second lever, one high portion lying at each side of the intersection of the levers, and a cam element on the first lever normally positioned in said low cam portion and shiftable with the first lever so that rocking of the first lever to either of its active positions effects rocking of the second lever to cause disengagement of the brake parts, said low portion accommodating biased movement of the second lever for causing engagement of the brake parts when the first lever is in its neutral position.

2. The invention defined in claim 1, further characterized in that: said high cam portions and the cooperative cam element of the first lever are constructed and operated as detents to releasably hold the first lever in any selected one of its neutral or active positions.

3. Driving mechanism, comprising: support means; a driving member and a driven member journaled on the support means; a combined brake and clutch unit, including a first brake part and a first clutch part, each keyed to the driven member, and a second clutch part keyed to the driving member and selectively engageable with and disengageable from the first clutch part; actuating means shiftable back and forth on the support means for selectively effecting engagement and disengagement of the clutch parts; a first lever having one portion thereof operatively engageable with the actuating means to control said actuating means; means pivoting the lever on the support means for rocking in one direction from a neutral position in which the actuating means is positioned so that the clutch parts are disengaged to a first active position in which the clutch parts are engaged, and, selectively, in the opposite direction to a second active position in which the actuating means is positioned so that the clutch parts are disengaged; a second lever pivoted on the support means and having a first arm proximate to the brake means and a second arm arranged in intersecting relation to the first lever; a second brake part connected to the first arm of the second lever and selectively engageable with and disengageable from the first brake part; means biasing the second lever in one direction to effect engagement of the brake parts; and cooperative interengageable means on the first and second levers, including a low cam portion between a pair of spaced apart high portions on the second arm of the second lever, one high portion lying at each side of the intersection of said levers, and a cam element on the first lever normally in the low cam portion and movable with the first lever so that rocking of the first lever to either of its active positions effects rocking of the second lever to cause disengagement of the brake parts, said low portion accommodating biased movement of the second lever for causing engagement of the brake parts when the first lever is in its neutral position.

LEONARD B. NEIGHBOUR.
ORVILLE P. LANCE.

References Cited in the file of this patent

UNITED STATES PATENTS

| Number | Name | Date |
| --- | --- | --- |
| 718,916 | Covell | Jan. 20, 1903 |
| 965,825 | Locke et al. | July 26, 1910 |
| 2,151,150 | Pohlmeyer | Mar. 21, 1939 |
| 2,501,198 | Wagner et al. | Mar. 21, 1950 |